US007296163B2

(12) United States Patent
Cybenko

(10) Patent No.: US 7,296,163 B2
(45) Date of Patent: Nov. 13, 2007

(54) SYSTEM AND METHODS FOR ENCRYPTED EXECUTION OF COMPUTER PROGRAMS

(75) Inventor: George Cybenko, Etna, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 842 days.

(21) Appl. No.: 09/759,402

(22) Filed: Jan. 12, 2001

(65) Prior Publication Data

US 2002/0041680 A1   Apr. 11, 2002

Related U.S. Application Data

(60) Provisional application No. 60/181,363, filed on Feb. 8, 2000.

(51) Int. Cl.
*G06F 12/14* (2006.01)
*H04L 9/00* (2006.01)
*H04K 1/00* (2006.01)

(52) U.S. Cl. .................. 713/190; 713/153; 713/165; 380/255

(58) Field of Classification Search ............ 380/28; 713/190–193
See application file for complete search history.

(56) References Cited

U.S. PATENT DOCUMENTS 4,417,305 A    11/1983  Berstis (Continued)

FOREIGN PATENT DOCUMENTS

EP          1619820 A2  *  1/2006

(Continued)

OTHER PUBLICATIONS

Saner et al. Protecting Mobile Agents Against Malicious Hosts, Feb. 1998, Mobile Agent Security.*

(Continued)

*Primary Examiner*—Ayaz Sheikh
*Assistant Examiner*—Aravind K Moorthy
(74) *Attorney, Agent, or Firm*—Lathrop & Gage LC

(57) ABSTRACT

The invention provides a method for encrypting a program for execution on a remote host computer on a network, such that correct execution by the remote host computer is ensured, and such that the remote host computer remains unaware of the computations or data associated with execution. Results from the computations at the remote host computer are transmitted to a control computer, on the network, which decodes the results to useful data representative as output from the program. In a first step of the method, the program is encoded as a unitary matrix multiplication, $U_{ij}$, of i dimensions by j dimensions. $U_n$ is the set of unitary matrices of size n, forms a non-commutative group under matrix multiplication, and has a unique group-invariant Haar measure probability distribution; $U_{ij}$ is thus an element of $U_n$. In a second step, an input data string to the program is encoded as a vector $b_j$ of n dimensions. The first and second steps can be performed in either order. In a third step, two independent identically distributed unitary matrices $X_{ij}$, $Y_{ij}$ are generated from the Haar distribution over $U_n$. Preferably, $X_{ij}$, $Y_{ij}$ are randomly generated. In a fourth step, U' is computed as XUY* and sent to the remote host over the network. In a fifth step, b' is computed as Yb and sent to the remote host over the network. The fourth and fifth steps can be performed in either order. In a sixth step, the remote host computes the product of XUY* and Yb and sends the result to the control computer on the network. In a seventh step, the control computer computes X*XUb to determine the multiplication of Ub, the desired output of the program.

16 Claims, 2 Drawing Sheets

U.S. PATENT DOCUMENTS

| | | | | |
|---|---|---|---|---|
| 4,847,902 A | * | 7/1989 | Hampson | 713/190 |
| 5,007,083 A | * | 4/1991 | Constant | 713/194 |
| 5,572,219 A | * | 11/1996 | Silverstein et al. | 342/375 |
| 5,677,696 A | * | 10/1997 | Silverstein et al. | 342/360 |
| 5,812,072 A | * | 9/1998 | Masters | 341/55 |
| 6,317,766 B1 | * | 11/2001 | Grover | 708/400 |
| 6,385,727 B1 | * | 5/2002 | Cassagnol et al. | 713/193 |
| 6,578,018 B1 | * | 6/2003 | Ulyanov | 706/14 |
| 6,631,347 B1 | * | 10/2003 | Kim et al. | 704/222 |
| 6,693,976 B1 | * | 2/2004 | Hassibi et al. | 375/299 |
| 6,801,579 B1 | * | 10/2004 | Hassibi et al. | 375/264 |
| 6,836,839 B2 | * | 12/2004 | Master et al. | 712/29 |
| 6,865,237 B1 | * | 3/2005 | Boariu et al. | 375/295 |

FOREIGN PATENT DOCUMENTS

| | | | |
|---|---|---|---|
| WO | WO9805142 | * | 2/1998 |

OTHER PUBLICATIONS

O. J. Staffans, Quadratic optimal control of stable well-posed linear systems, Trans. of Amer. Math. Soc. 349 (1997), 3679-3715.*

Luo et al, A Novel Symmetric Cryptography Based on the Hybrid Haar Wavelets Encoder and Chaotic Masking Scheme, 2002, IEEE, pp. 933-944.*

Delgosha et al, Public-Key Cryptography Using Paraunitary Matrices, 2006, pp. 3489-3504.*

Paul R. Halmos, "Haar Measure", Measure Theory, Chapter XI, 1950, pp. v and 250-265, Van Nostrand Reinhold Company, 450 West 33rd Street, New York, NY 10001.

G. W. Stewart, "The Efficient Generation of Random Orthogonal Matrices with an Application to Condition Estimators", Society for Industrial and Applied Mathematics, Jun. 1980, pp. 403-409, Slam J. Numer. Anal., vol. 17, No. 3, Department of Computer Science, University of Maryland, College Park, MD 20742.

George Cybenko, article: "Encrypted Execution of Encrypted Programs", Jan. 22, 2000, pp. 1-11, Thayer School of Engineering, Dartmouth College, Hanover, NH 03755.

* cited by examiner

SYSTEM AND METHODS FOR ENCRYPTED EXECUTION OF COMPUTER PROGRAMS

RELATED APPLICATIONS

This application claims the benefit of U.S. Provisional Application No. 60/181,363, filed Feb. 8, 2000, entitled System and Methods for Executed Program Encryption, which is expressly incorporated herein by reference.

GOVERNMENT LICENSE RIGHTS

The U.S. Government has a paid-up license in this invention and the right in limited circumstances to require the patent holder to license others on reasonable terms as provided for by the terms of Contract No. F30602-98-2-0107, awarded by the Defense Advanced Research Projects Agency, Contract No. F49620-97-1-0382, awarded by the Air Force Office of Scientific Research, Contract No. ATM-9873138 awarded by the National Science Foundation, and Contract No. CCR-98113744 awarded by the National Science Foundation.

BACKGROUND OF THE INVENTION

Distributed network-based computing is growing quickly, particularly with the computerization of corporations and the expansion of the Internet. Security for distributed network-based computing is thus of utmost importance to ensure data integrity and privacy, and to maintain corporate and intellectual integrity.

One particular threat to security in distributed network-based computing involves program execution on a remote host ("host" is used herein synonymously with host computer) that may or may not be reliable or "trusted." The prior art has been unable to ensure that (a) such program execution is performed correctly or (b) the remote host learned nothing of computations or data associated with underlying program execution. Accordingly, improvements to network security to address these security issues are needed.

One object of the invention is to provide a method for encrypting and subsequently executing programs on a remote computer in a manner that solves the afore-mentioned problems. Special computing hardware is not required. This object and others will be apparent in the description that follows.

SUMMARY OF THE INVENTION

In one aspect, the invention provides a method for encrypting a program for execution on a remote host computer on a network, such that incorrect execution by the remote host computer is detectable, and such that the underlying software code remains secure, and such that the computations and the data associated with execution are unintelligible standing alone and otherwise useless at the host computer. Results from the encrypted computations at the remote host computer are transmitted to a control computer, on the network, which decodes the results to useful data representative as output from the program. In a first step of the method, the program is encoded as a unitary matrix, $U=(U_{ij})$, with n rows and n columns, such that the execution of the program on a dataset is realized by matrix multiplication of the matrix U with the vector of input data bits.

This encoding is a representation of computer programs expressed in terms of reversible logic or quantum gates. That such a representation is possible can be illustrated as follows. All operations of a Turing computer can be reduced to the primitive logic operations, "XOR" (exclusive OR) and "NOT" (negation), operating appropriately on binary bits of data. For example, if r and s are two bits, then "r XOR s" is the bit 1 (true) if either but not both r and s are 1 while "r XOR s" is 0 (false) otherwise. Similarly, "NOT r" is 0 if r is 1 and 1 if r is 0. These two operations constitute binary operations or binary logic on which digital computers are based. The basic operation of digital computers can be reduced to these two primitive operations combined in a circuit. Moreover, computer programs operating on input data can be expressed as a predetermined sequence of such binary logic operations. If the program consists of a finite number of steps, then the program can be expressed as a predetermined finite sequence of binary logic operations.

The representation of a computer program using such binary logic operations is in general not "reversible." Evidently, if "r XOR s" has a value of 0 for example, the values of r and s individually cannot be determined because they could be any one of the cases: r=s=0; r=s=1. The operation "NOT" is reversible. Reversible logic represents a bit as a 2-dimensional vector, $(1\ 0)'$ for 1 (true) and $(0\ 1)'$ for 0 (false). In this specification, the notation ' denotes the transpose of a matrix or a vector. Two bits are then two 2-dimensional vectors that can be represented in a combined way by a 4-dimensional vector. The possible values of such a four dimensional representation are $a=(1\ 0\ 0\ 0)'$, $b=(0\ 1\ 0\ 0)'$, $c=(0\ 0\ 1\ 0)'$ and $d=(0\ 0\ 0\ 1)'$ where $a=(1\ 0\ 0\ 0)'$ represents input bits both false, $b=(0\ 1\ 0\ 0)'$ represents input bit 1 false and input bit 2 true, $c=(0\ 0\ 1\ 0)'$ represents input bit 1 true and input bit 2 false and $d=(0\ 0\ 0\ 1)'$ represents both input bits being true. The same representation can be used for the output bits with the convention that the first bit of the output represents the logical value of the XOR operation and the second bit is used for reversibility.

For example, both b and d are outputs with XOR value true. We can define the XOR logic by the following mapping from inputs to outputs: a goes to a, b goes to c, c goes to d and d goes to b. In matrix-vector multiplication terms, this can be represented by the matrix $$\begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

which is a unitary matrix, verified by multiplying the matrix by its transpose. Similarly, the NOT operator can be represented as the unitary $$\begin{bmatrix} 0 & 1 \\ 1 & 0 \end{bmatrix}$$

which can be verified by direct multiplication. These two constructions demonstrate that elementary logic operations can be represented as unitary operations. Since the direct product and composition of unitary operations is a unitary operation, this shows that a finite number of steps of a Turing program can be represented as a unitary matrix operation.

The set of unitary matrices with n rows and n columns, denoted by $U_n$, forms a non-commutative group under standard matrix multiplication. It therefore has a unique group-invariant Haar measure that determines an intrinsic uniform probability distribution. The program encoding, U, is thus an element of a group, $U_n$, having an intrinsic uniform Haar probability distribution. In a second step, an input data string to the program is encoded as a vector, $b=(b_j)$, of length n. The first and second steps can be performed in either order or simultaneously. In a third step, two independent identically distributed unitary matrices, $X=(X_{ij})$ and $Y=(Y_{ij})$, are generated from the uniform probability distribution over $U_n$ determined by the Haar distribution. X and Y are therefore uniformly randomly distributed within the group when generated in this way. In a fourth step, U' is computed as XUY* and sent to the remote host over the network. In a fifth step, b' is computed as Yb and sent to the remote host over the network. The fourth and fifth steps can be performed in either order. In a sixth step, the remote host computes the product of XUY* and Yb and sends the result to the control computer on the network. In a seventh step, the control computer computes X*XUb to determine the multiplication of Ub, the desired output of the program.

The prior art is familiar with Alan Turing, the British mathematician who in 1936 published a paper called "On Computable Numbers with an Application to the Entscheidungsproblem". It is generally recognized by those skilled in the art that Turing's 1936 paper founded modern theories of computation and introduced the concept of a "Turing Machine." The Turing Machine is said to perform a computation (a "Turing computation") using a tape of infinite length with an infinite series of square cells. In one step of its operation, a Turing Machine device reads a symbol from the tape, alters its own internal state, possibly changes the symbol in the tape cell it just read and then moves the tape left or right to another cell tape. Another step is then performed. The afore-mentioned method of the invention relies, in part, on the premise that matrix multiplication, specifically unitary matrix multiplication, is a general representation for a computer program determining a fixed number of steps of a Turing computation. Moreover, the method of the invention relies further on the fact that the execution of such a Turing computation on the input data string that is initially on the tape is entirely equivalent to the matrix product of the unitary matrix, U, representing the Turing machine computation or program, with an input data vector, b. The product is hereinabove described as Ub.

The encryption scheme of the invention, described in more detail below, has specific advantages stemming from the uniform distribution of unitary matrices. Specifically, encryption of programs according to the invention in terms of random unitary matrix pre- and post-multiplications results in Haar uniform probabilistic distribution of the encrypted programs—wherein any two programs or data strings of the same size that are encrypted separately according to this method will have the identical statistical distribution of all data in their encoded representations. Since all programs of a fixed size will have encrypted representations that are statistically indistinguishable, the remote computer will not be able to learn anything about a specific program because there is nothing that distinguishes any one such encrypted program from any other such encrypted program.

In another aspect, the method has the further step of embedding constants into the data and program prior to the step of encryption, to enable detection of incorrect execution at the remote host or tampering with either the data or program representations. This can be accomplished by appending a trailing 1, as $$\begin{bmatrix} b \\ 1 \end{bmatrix},$$

to the input data vector b and embedding U into an (n+1) by (n+1) unitary as $$\begin{bmatrix} U & 0 \\ 0 & 1 \end{bmatrix}$$

so that the correct output is $$\begin{bmatrix} Ub \\ 1 \end{bmatrix}.$$

Any change to $$X \begin{bmatrix} Ub \\ 1 \end{bmatrix}$$

either through error or malicious tampering will result in a decoded answer that will not have exactly 1 as the trailing entry of the decoded output vector $$\begin{bmatrix} Ub \\ 1 \end{bmatrix}.$$

These and other aspects will become more apparent in reviewing the description that follows.

DETAILED DESCRIPTION OF THE DRAWINGS

Figure 1:
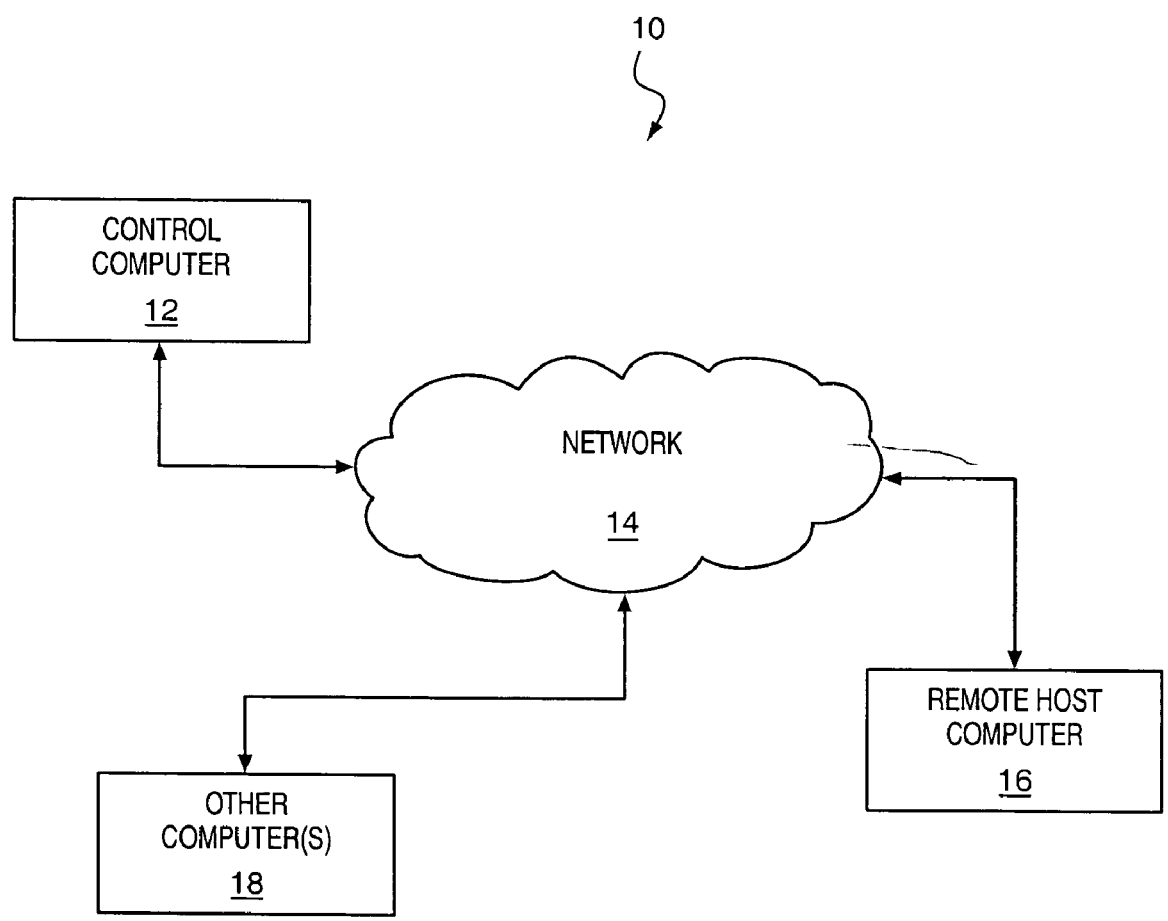
FIG. 1 shows a distributed network computing system constructed according to the invention.

FIG. 1 shows a distributed network computing system 10 constructed according to the invention. System 10 includes a control computer 12 and a remote host computer 16, connected together by computing network 14. Other computers 18 can be, and usually are, connected to network 14 without departing from the scope of the invention. Network 14 can be the Internet, a virtual private network, LAN or other network, wired or wireless, connecting computing devices together.

In operation, a program to be executed on host 16 is first encrypted on control computer 12 and sent to host 16 over network 14. Data for input to the program is also encrypted at control computer 12 or elsewhere 18 in the network 14 and sent to host 16 over network 14. Host 16 then executes an encrypted form of the program using the encrypted form of the data; and transmits results through network 14.

Control computer 12 (or another computer with the decode information) then accesses and decodes the results to determine the desired output.

These operations occur through matrix multiplication. As described herein, this means that the program is first converted to a matrix of the form $A=(a_{ij})$, and that the input data for the program is converted to a vector of the form $b=(b_j)$, such that A and b are compatible for multiplication. The result describing the desired output from executing the program with the data string is a matrix-vector product $c=Ab$, defined as $$c_i = \sum_j a_{ij} b_j$$

A and b are next encrypted so that the details of A and b, and therefore also of c, are not known at host computer 16. Specifically, A is converted to $A'=XAY^{-1}$ and b is converted to $b'=Yb$, where X and Y are matrices of the same size as A that have been independently generated as random unitary matrices with respect to the Haar distribution on the group of unitary matrices. A' and b' are then sent to host computer 16 for execution. Host computer 16 computes $c'=A'b'=(XAY^{-1})(Yb)=XAb$. Subsequently XAb, sent back to the control computer 12, is decoded by computing $X^{-1}A'b'=Ab=c$, the desired result.

Matrices A, b are unitary matrix multiplications. Unitary operators or matrices are square matrices, P, defined by the property that $PP^*=P^*P=I$, where I is the identity matrix. Another way of stating this property is to say that for unitary P, $P^*=P^{-1}$, the inverse matrix of P. The matrix $P^*$ is the complex conjugate transpose of P so that if the ij-th entry of P is $P_{ij}=a_{ij}+i\,b_{ij}$ then the ij-th entry of $P^*$ is $a_{ji}-i\,b_{ji}$ where $a_{ji}$ and $b_{ji}$ are real numbers. Therefore, unitary operators are invertible and their inverses are equal to their complex conjugate transpose: $P^{-1}=P^*$. By ensuring that the data string and program are encoded, respectively, as a vector and a unitary operator, then the multiplication of the vector by the unitary operator defines steps of Turing computations to determine the desired output. Specifically, the unitary operator encodes the finite Turing computation and the vector encodes the input data string.

The above unitary operators are also randomized. Since unitary matrices are non-commutative under matrix multiplication, they each have unique group-invariant probability distributions (sometimes denoted as the Haar measure). If $U_n$ denotes the unitary operators on complex n-space, $C_n$, and $S \subset U_n$ is a measurable subset of $U_n$ then the Haar probability distribution over $U_n$ satisfies:

$$1 \geq \mu(US)=\mu(SU)=\mu(S) \geq 0$$

for all $U \in U_n$. That is, the probability of a set is invariant under the action of multiplication by a group element. In addition, $\mu(U_n)=1$. Accordingly, the Haar distribution is the intrinsic uniform probability distribution of $U_n$. If X is a random unitary matrix distributed according to the Haar distribution, and U is a fixed unitary, then the products XU and UX are uniformly distributed according to the Haar distribution as well.

An important part of the above encryption, therefore, is the effective generation of unitary matrices, distributed according to the Haar probability distribution on $U_n$. G. W. Stewart, in "The efficient generation of random orthogonal matrices with an application to condition estimators," SIAM J. Numer. Anal., 17:403-409 (1980), incorporated herein by reference, provides one technique for generating random unitary matrices.

Figure 2:
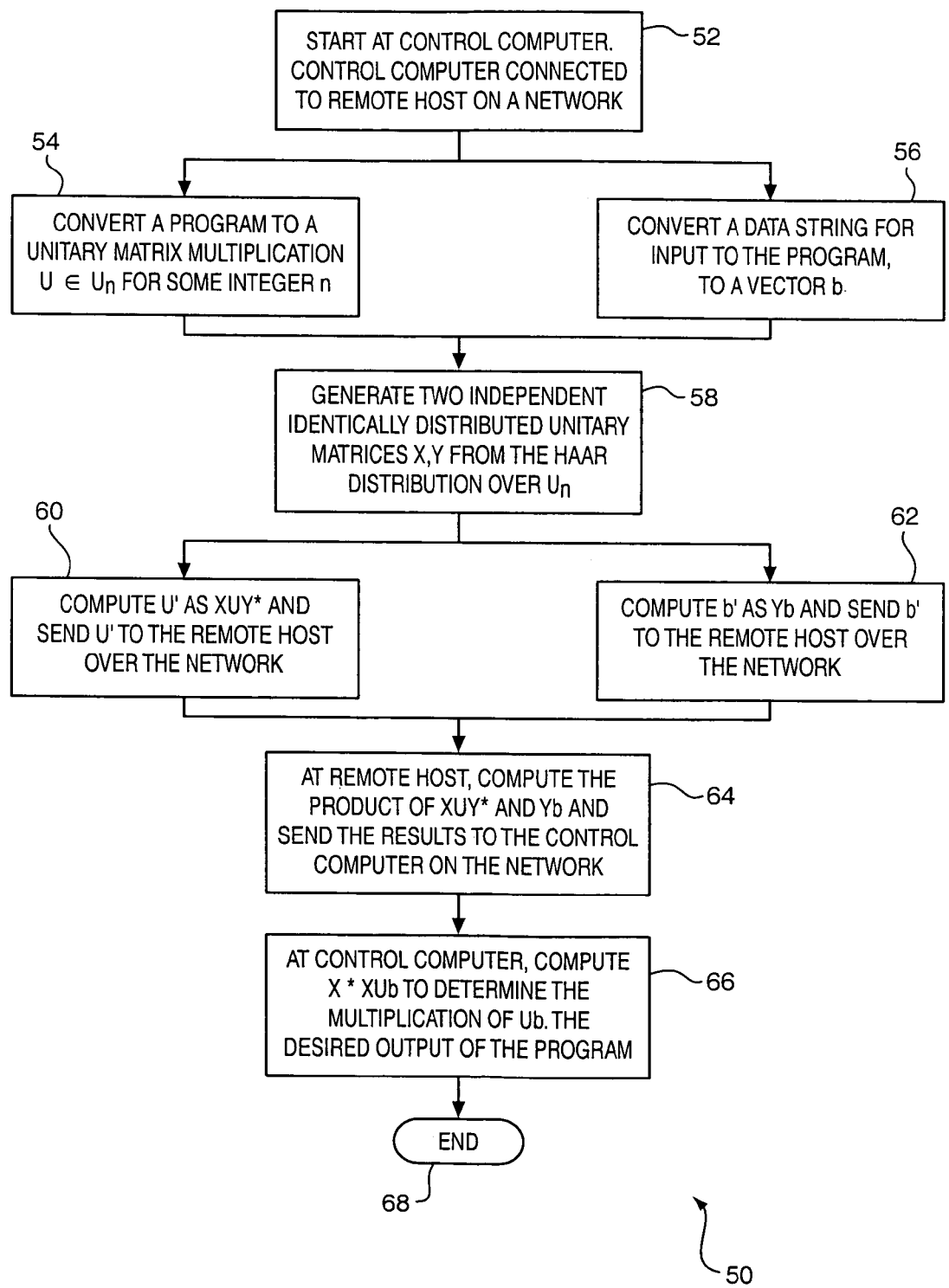
FIG. 2 illustrates a flow chart for steps taken in the system of FIG. 1.

FIG. 2 is a flow chart 50 illustrating steps occurring between host computer 16 and control computer 12. Those skilled in the art should appreciate that control computer 12 is illustrative in that like functions of control computer 12 may be performed on other computers connected to network 14; alternatively, like functions of control computer 12 may be distributed among several other computers connected to network 14. The important feature of encryption as described is that host computer 16 does not glean intelligible or otherwise useful information of the underlying program or program software code, or of the data and computations entered as input or generated thereby.

Processing in a method 50 in accordance with the invention, as depicted in FIG. 2, begins at control computer 12 (or other computer in network with host computer 16), identified as step 52. Step 54 and 56 may be done concurrently or in either order: step 54 converts a program to a unitary matrix multiplication $U \in U_n$ for some integer n; step 56 converts a data string, for input to the program, to a vector b. In step 58, two independent identically distributed unitary matrices, e.g., X, Y, are generated from the Haar distribution over $U_n$. Step 60 and 62 may be done concurrently or in either order: step 60 computes U' as XUY* and sends U' to the remote host over the network; step 62 computes b' as Yb and sends b' to the remote host over the network. In step 64, remote host 16 computes the product of XUY* and Yb and sends the results to control computer 12 on network 14. In step 66, control computer 12 computes X*XUb to determines the multiplication of Ub, the desired output of the program. Processing can continue for other programs or data, or alternatively end at step 68.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

What is claimed is:

1. A method for encrypting programs for encrypted execution on a computer network having a remote host computer, comprising the steps of:
    encrypting a program as a unitary matrix with n rows and n columns;
    encrypting an input data string to the program as a vector of length n, wherein execution of the program on the input data string is realized by matrix multiplication of the unitary matrix with the vector;
    loading the encrypted program and the encrypted data string on the host computer;
    executing the encrypted program, using the encrypted data string, on the host computer;
    communicating results from the host computer to the network; and
    decoding the results into output representative of executing the encrypted program with the encrypted data string, wherein computations and data associated with the program and data string are unintelligible and useless at the host computer.

2. A method of claim 1, wherein the step of encrypting a program comprises convening the program to a unitary matrix multiplication.

3. A method of claim 2 wherein the step of converting the program comprises converting the program to a unitary matrix multiplication U such that $U \in U_n$ for some integer n, where $U_n$ represents a group of unitary matrices of size n.

4. A method of claim 3, wherein the step of encrypting the program comprises generating two independent identically distributed unitary matrices X, Y from the uniform probability distribution over $U_n$ determined by the Haar distribution.

5. A method of claim 4, wherein the step of encrypting a program comprises the steps of computing U' as XUY* and communicating U' to the remote host computer over the network.

6. A method of claim 4, wherein the step of encrypting the input data string comprises converting the input data string to a vector b.

7. A method of claim 6, wherein the step of encrypting comprises the steps of computing b' as Yb and communicating b' to the remote host over the network.

8. A method of claim 7, wherein the step of executing the encrypted program, using the encrypted data string, on the host computer comprises the steps of computing the product of XUY* and Yb and communicating results to the network.

9. A method of claim 8, wherein the step of decoding the results into output comprises computing X*XUb, external of the host computer, to determine the multiplication of Ub as desired output of the program, wherein XUY* and Yb is (XUb) and X*XUb is obtained by matrix multiplication X*(XUb).

10. A method of claim 1, wherein the step of decoding comprises decrypting at a control computer connected to the network and the host computer.

11. A method of claim 1, wherein the network comprises the Internet.

12. A method of claim 1, wherein the network comprises a virtual private network.

13. A method of claim 1, wherein the network comprises a local area network (LAN).

14. A method of claim 1, further comprising embedding one or more constants into the input data string or program, prior to encrypting, to detect incorrect execution or data tampering.

15. A secured computer network for executing encrypted computer programs at a remote host computer without sharing intelligible or otherwise useful program code, computations or data associated with execution, comprising:
a control computer for encrypting a program as a unitary matrix with n rows and n columns and for encrypting an input data string to the program as a vector of length n, wherein execution of the program on the input data string is realized by matrix multiplication of the unitary matrix with the vector; and
a host computer, in network with the control computer, for loading the encrypted program and the encrypted data string, the host computer executing the encrypted program, using the encrypted data string, and communicating results to the control computer for decoding, the host computer having insufficient intelligible program code, computations or data to execute the encrypted program.

16. A network of claim 15, wherein the control computer embeds one or more constants into the unitary matrix or data string, wherein the results from the host computer indicate tampering or incorrect execution of the encrypted program.

* * * * *